(12) United States Patent
Cai (10) Patent No.: US 10,851,006 B2
(45) Date of Patent: Dec. 1, 2020

(54) SUPERCRITICAL WATER OXIDATION REACTOR AND PROCESS

(71) Applicant: Aquarden Technologies ApS, Skaevinge (DK)

(72) Inventor: Zhuoyan Cai, Hillerød (DK)

(73) Assignee: Aquarden Technologies ApS, Skaevinge (DK)

( * ) Notice: Subject to any disclaimer, the term of this patent is extended or adjusted under 35 U.S.C. 154(b) by 190 days.

(21) Appl. No.: 16/301,090

(22) PCT Filed: May 19, 2017

(86) PCT No.: PCT/DK2017/050164
§ 371 (c)(1),
(2) Date: Nov. 13, 2018

(87) PCT Pub. No.: WO2017/198275
PCT Pub. Date: Nov. 23, 2017

(65) Prior Publication Data
US 2019/0185361 A1   Jun. 20, 2019

(30) Foreign Application Priority Data

May 19, 2016   (EP) ..................................... 16170331
Jan. 6, 2017   (DK) ................................. 2017 70006

(51) Int. Cl.
*B01D 1/00* (2006.01)
*B01D 3/02* (2006.01)
(Continued)

(52) U.S. Cl.
CPC .......... *C02F 11/086* (2013.01); *B01D 1/0017* (2013.01); *B01D 1/0023* (2013.01);
(Continued)

(58) Field of Classification Search
CPC .. B01D 1/0017; B01D 1/0023; B01D 1/0082; B01D 3/02; B01D 3/04; B01J 3/008; B01J 19/0013; C02F 1/004; C02F 1/00804; C02F 1/42; C02F 1/441; C02F 1/725; C02F 11/086; C02F 2101/16; C02F 2101/20; C02F 2101/30; C02F 2103/06; C02F 2209/02; Y02P 20/544
See application file for complete search history.

(56) References Cited

U.S. PATENT DOCUMENTS 3,361,647 A   1/1968   Brown et al.

FOREIGN PATENT DOCUMENTS

EP       0576467 A1    1/1994
WO    2007051469 A1    5/2007

OTHER PUBLICATIONS

Marrone et al., Salt precipitation and scale control in supercritical water oxidation—part B: commercial/full-scale applications, The Journal of Supercritical Fluids, 2004, 24 pages, vol. 29, copyright 2003 Elsevier B. V.

(Continued)

*Primary Examiner* — Lucas A Stelling
(74) *Attorney, Agent, or Firm* — Taft Stettinius & Hollister LLP (57) ABSTRACT

The present invention relates to supercritical water oxidation reactor adapted to contain inside the reactor an aqueous fluid below and above its supercritical state, said fluid comprising organic and/or inorganic material and a method of controlling such a reactor.

29 Claims, 7 Drawing Sheets

(51) Int. Cl.
  *B01D 3/04* (2006.01)
  *B01J 3/00* (2006.01)
  *C02F 1/00* (2006.01)
  *C02F 1/04* (2006.01)
  *C02F 1/44* (2006.01)
  *C02F 1/72* (2006.01)
  *C02F 11/08* (2006.01)
  *B01J 19/00* (2006.01)
  *C02F 1/42* (2006.01)
  *C02F 101/16* (2006.01)
  *C02F 101/20* (2006.01)
  *C02F 101/30* (2006.01)
  *C02F 103/06* (2006.01)

(52) U.S. Cl.
  CPC ............ *B01D 1/0082* (2013.01); *B01D 3/02* (2013.01); *B01D 3/04* (2013.01); *B01J 3/008* (2013.01); *C02F 1/008* (2013.01); *C02F 1/04* (2013.01); *C02F 1/725* (2013.01); *B01J 19/0013* (2013.01); *C02F 1/004* (2013.01); *C02F 1/42* (2013.01); *C02F 1/441* (2013.01); *C02F 2101/16* (2013.01); *C02F 2101/20* (2013.01); *C02F 2101/30* (2013.01); *C02F 2103/06* (2013.01); *C02F 2209/02* (2013.01); *Y02P 20/544* (2015.11)

(56) References Cited

OTHER PUBLICATIONS

Xu et al., A novel concept reactor design for preventing salt deposition in supercritical water, Chemical Engineering Research and Design, 2010, 8 pages, vol. 88, copyright 2010 the Institution of Chemical Engineers, Published by Elsevier B. V.
International Search Report; European Patent Office; International Application No. PCT/DK2017/050164; dated Jul. 6, 2017; 4 pages.
Written Opinion of the International Searching Authority; European Patent Office; International Application No. PCT/DK2017/050164; dated Jul. 6, 2017; 6 pages.
International Preliminary Report on Patentability; The International Bureau of WIPO; International Application No. PCT/DK2017/050164; dated Nov. 20, 2018; 7 pages.

SUPERCRITICAL WATER OXIDATION REACTOR AND PROCESS

CROSS-REFERENCE TO RELATED APPLICATIONS

This application is a U.S. National Phase of International PCT Application No. PCT/DK2017/050164 filed May 19, 2017, which claims priority to European Patent Application No. 16170331.9 filed May 19, 2016 and Danish Patent Application No. PA 2017 70006 filed Jan. 6, 2017, each of which are incorporated herein by reference in their entirety.

FIELD OF THE INVENTION

The present invention relates to supercritical water oxidation reactor adapted to contain inside the reactor an aqueous fluid below and above its supercritical state, said fluid comprising organic and/or inorganic material and a method of controlling such a reactor.

BACKGROUND OF THE INVENTION

Supercritical water treatment such as supercritical water gasification (SCWG) or super-critical water oxidation (SCWO) are treatment processes where the fluid to be treated must be heated to very high reaction temperatures. The fluid is also pressurised above 220 bar. Water reaches its supercritical state at a temperature of around 374° C. and a pressure of around 221 atm. The SCWO process is an efficient thermal oxidation process useful for treating a wide range of aqueous solutions containing organic waste materials and in-organic waste materials. These may include brine, industrial wastewaters, hazardous organic material or sludge from water treatment plants containing non-biodegradable pollutants.

Supercritical water has a number of unique properties, which makes it attractive for treating hazardous organic compounds. In general, higher temperatures lead to higher rates of reactions. Supercritical water also has unique diffusivity and in particular solubility properties. Organic compounds largely insoluble in water at ambient conditions are highly soluble in supercritical water. Furthermore organic compounds and oxidants mix homogeneously in the supercritical phase, thereby enabling an efficient oxidation of the compounds/material. Subsequently, the resulting distillate, i.e. the purified liquid, can be discharged in a conventional manner.

Conversely, inorganic substances can be separated and withdrawn for disposal. Inorganic substances such as salt and heavy metals are dramatically less soluble in super-critical water as compared to water at ambient conditions. Because of this low solubility, solid inorganic substances such as salts precipitate in the SCWO-process to form a salt concentrate or a residue. Typically, the salts and solids are removed in the process as so-called residue, brine or concentrate. This presents a challenge for operating a SCWO-reactor, since these inorganic substances can quickly lead to equipment fouling, plugging, clogging and/or erosion especially if the precipitation is uncontrolled and the precipitate remains inside the reactor. An efficient residue separation system for recovering the salts at the concentrate outlet of the SCWO-reactor is essential for an efficient overall process.

The oxidation in a SCWO process is exothermic whereby heat is generated. From a thermodynamically point of view, the amount of generated heat is often/sometimes sufficient to heat the feed fluid and maintain operation temperatures. However as the SCWO process is complex in the sense that the fluid enters into e.g. reactor with e.g. a temperature of 20° C. and pressure in the order of 250 bar, and the heat from oxidation is generated in a process step reached after the fluid is brought into its supercritical state, the heat to be used in the sub-critical stage is to be extracted from the super critical fluid and re-distributed to the low temperature fluid (sub-critical fluid) if to be used as a heat source for heating the sub-critical fluid. While such an energy redistribution may, at a first glance, be viewed as an "easy task", an attempt to re-distribute heat to a preceding (upstream) process step clearly reveals the true non-linear behaviour of the system due to the change of the fluid's properties at critical conditions. Further, as the phase change into supercritical phase is a "true phase change" in the sense that it occurs at constant temperature (like evaporation), there is a further inherent instability "built" into the SCWO process.

E.g. if too much heat is redistributed, the fluid will become super-critical shortly after its introduction into the reactor providing almost no sub-critical zone in the reactor, leaving no space for retrieving residue. Further, if too much heat is extracted from the supercritical phase, the risk of choking the oxidation may arise whereby the energy production is arrested. On the other hand, if too little heat is redistributed the fluid may not reach it supercritical state whereby the process is disrupted.

This problem is enhanced by a desire to extract the precipitated salt (as a residue) which precipitation occurs in a zone where the fluid goes from sub-critical to super-critical. This zone may be referred to as a "salt mirror" as precipitated salt as a flow of salt towards this zone from the subcritical state is hindered from passaging the zone due to the much smaller solubility in the supercritical fluid. It is further noted, that the "salt mirror" in general has a vertical extension, thereby constituting a zone of a given height in a reactor. As the vertical position of the salt mirror, in a reactor, is directly linked to the heating or cooling of the fluid, the characteristic of the fluid itself and possibly an oxidation agent added to the fluid, a fixed position for extracting precipitated salt e.g. as a brine may work under a one set of conditions but may not be appropriate for another set of operation conditions as the position of the salt mirror may have changed.

EP576467 discloses a method for supercritical distillation of liquid. The liquid to be treated is fed into a reactor comprising a heating zone for heating the liquid and transferring it to an overlying separation zone. The separation zone has a vapour outlet above the separation zone and a liquid residue outlet placed in the heating zone where the supercritical temperature is reached. The residue outlet feeds fluid through a first heat exchanger arranged in the heating zone before the fluid leaves the reactor. The vapour outlet is placed at the top of the separation zone for withdrawing the treated distillate and feed the withdrawn distillate through a second heat exchanger arranged in the heating zone. Further, heat is supplied to the separation zone from an external heat source e.g. by heating the distillate after being withdrawn and prior to be fed through the second heat exchanger. Thus, the heating zone comprises two heat exchangers (such as two cross flow heat exchangers) such that the liquid phase in the heating zone is heated by the residue and the distillate. Salts precipitating at near critical conditions are withdrawn by the residue outlets.

While the attempt to apply heat to the separation zone to reach high oxidation/gasification temperatures suggested in EP576467 may be a workable solution, it will in many cases simply raise the temperature of the residue outlet above the critical temperature, especially if a high amount of energy is released from the oxidation of the organic content in the feed. When the temperature of the residue outlet is above the critical temperature, the precipitation will take place below the residue outlet and precipitates will therefore not be extracted from the reactor. This will cause inorganic material to precipitate and stick to the internal surfaces of the reactor below the residue outlet. As a result, the residue outlet retains only supercritical fluid with low salt content, and is unable to withdraw the highly concentrated subcritical residue below it, eventually causing plugging of the reactor as the subcritical residue saturates around the surface of the first heat exchanger. The reactor setup according EP576467 may be seen as working optimal with a specific fluid composition whereby the versatility the reactor setup shown is subject to improvements.

In Xu, D. H. et al "A novel concept reactor design for preventing salt deposition in supercritical water" (Chem. Eng. Research and Design. Part A, Institution of Chemical Engineers, XX. Vol 88, no 11, 1 Nov. 2010, pages 1515-1522) discloses reverse flow tank reactor. The disclosed reactor is divided into a supercritical zone above and subcritical below. Precipitated salt under supercritical condition fall down into the subcritical zone (formed by pumping quench water) and are re-dissolved. Clean fluid after removed salts, flow towards the top outlet of the reactor by the differences of density and flow resistance. While this reactor may be seen as being able to remove salts from a fluid, the reversal of the flow direction of the supercritical fluid as well as the cooling of the fluid to become subcritical in a lower region of the reactor may difficult to control outside a regime defined by specific fluid compositions and amounts thereof whereby the reactor setup is subject to improvements.

WO 2007/051469 illustrates an apparatus for distillation of a purifyable liquid near or above its critical point, wherein the purifyable liquid contains a dissolved solid. The apparatus comprises a separation vessel for separating the liquid into a vapour phase in a super residue separated by a liquid surface within said separation vessel, heat exchange means for transmitting heat from the vapour phase and liquid residue and from the vapour phase and the liquid residue to the purifyable liquid, means for pumping the purifyable liquid into said heat exchange means and for feeding the purifyable liquid into the separation vessel for separating the purifyable liquid into the vapour phase and the liquid residue separated by the liquid surface, the separation vessel has a liquid inlet, a vapour outlet and a residue outlet. Heating means is arranged at different vertical positions outside the vessel above the residue outlet.

Heating of fluid below the residue outlet is accomplished by the fluid present in the residue outlet heat exchange with the incoming fluid by use of internally arranged heat exchangers. Thereby the apparatus is configured for increasing or decreasing in a direct controllable manner—by use of heating means—the temperature above the residue outlet, whereas below the residue outlet, the temperature is controlled by the temperature difference between the fluid leaving the apparatus, the fluid entering the apparatus and the heat conductivity in the heat exchangers. Thus, no means are available for controlling directly the temperature below the residue outlet, whereby it may be difficult to assure that the salt mirror is located above the residue outlet for other fluid than fluid having a specific composition.

Hence, an improved reactor and method for controlling a reactor would be advantageous, and in particular a more efficient, versatile as to treating fluid with different compositions and/or reliable reactor and method would be advantageous.

OBJECT OF THE INVENTION

An object of the present invention is to provide an alternative to the prior art.

In particular, it may be seen as a further object of the present invention to provide a reactor and method of controlling a reactor that solves the above mentioned problems of the prior art.

SUMMARY OF THE INVENTION

Thus, the above described object and several other objects are intended to be obtained in a first aspect of the invention by providing a supercritical water oxidation reactor adapted to contain inside the reactor an aqueous fluid below and above its supercritical state, said fluid comprising organic and/or inorganic material. By being adapted to contain the fluid, if typically meant that the reactor is made from a material and shape allowing it to withstand the mechanical and chemical exposure during operation.

The reactor preferably comprises
a reactor body in the form of an elongate tubular element arranged, during use, with its longitudinal extension parallel to or substantially parallel to gravity, the reactor body being closed at its upper and lower ends thereby defining a cavity inside the reactor body;
a residue output connection having an inlet arranged at a first vertical height inside the cavity and having an outlet arranged outside the reactor body, preferably said residue output connection extends from its inlet downwardly towards the lower of the reactor;
a distillate output connection having an inlet arranged at a second vertical height inside cavity being higher than the first vertical height and having an outlet arranged outside the reactor body, preferably said distillate output connection extends from its inlet downwardly towards the lower end of the reactor;
an aqueous fluid inlet connection arranged at the lower end, such as at the bottom, of the rector body for inletting into the cavity the aqueous fluid to be brought into and above its supercritical state,
a plurality of individually controllable thermal elements arranged below the first vertical height at, in the reactor body and/or inside the cavity and being adapted to provide an individually controllable heat flux into/out from the cavity so as to impose a vertical temperature profile on the fluid inside the cavity,
a plurality of temperature sensors arranged to measure a fluid temperature, or a temperature of the reactor body, at a plurality of different vertical positions, including a position above and a position below the first vertical height and/or a salt concentration sensor arranged to measure the salt concentration in the fluid flowing through the residue output connection.

According to the invention, the residue outlet is typically arranged above the plurality of individually controllable thermal elements arranged below the first vertical height since the heat exchange of the streams inside the reactor may typically be insufficient to sustain the critical point at or above the residue outlet.

Without thermal elements, the huge amounts of energy released from oxidation of the organics in the supercritical region could force the critical point/salt mirror far below the residue outlet. Hence, it is important to improve control of the position of the salt mirror, by having thermal elements below the residue outlet, e.g. to remove energy below the residue outlet, as in this example where the oxidation energy forces the vertical position of the salt mirror below the residue outlet. Otherwise the only cooling source may be the ingoing feed fluids, which in many cases provides insufficient cooling, despite the efficiency of any heat exchanger.

It is noted that "above" and "below" also may include the position "at" e.g. for instance at the position of the first vertical height. Further, "in the reactor body" preferably refers to a position internally in the wall of the reactor.

By "individually controllable" is preferably meant that the heat flux provided by one of the thermal elements can be set independent another thermal element.

Aqueous fluid as used herein is used to mean inter alia a fluid mixture of oxidant (typically gas, e.g. enriched air) and aqueous feed, a fluid comprising organic and/or inorganic material, such as waste water, industrial waste water or the like.

Thus, by the presence of temperature sensors at the first vertical height (that is above, at and below the first vertical height) and/or a salt concentration sensor arranged to measure the salt concentration in the fluid flowing through the residue output connection, the vertical position of the salt mirror may be determined or at least estimated. This in combination with in particular the thermal elements arranged below the first vertical height provides the effect of controlling the process inside the reactor by controlling the heat flux into/out from the reactor below the salt mirror. Furthermore, the thermal conductivity of sub-critical liquid is significantly higher than that of supercritical fluid. Thus, by controlling the heat flux into/out from the reactor below the salt mirror, where the heat transfer is substantially higher due to the presence of sub-critical liquid, an efficient controlling of the processes is obtained. It is further noted, that the thermal elements above the first height may be in-active during longer periods of operation—if used at all—as, in preferred embodiment, the substantive amount of heat to be added to the reactor is added below the first vertical height. This is especially the case when substantial energy is released from the oxidation reactions above the first height.

In some embodiments of the invention, salt may be added to the liquid in the reactor which addition of salt may have a beneficial effect on the precipitation of salt inside the reactor.

In preferred embodiments of the supercritical water oxidation reactor, at least the thermal element(s) arranged below the first vertical height ($h_1$) may be configured to provide sufficient heat to fuel or cool the process Preferably, the thermal element(s) may be configured for and/or used for cooling only at and/or below the first vertical height ($h_1$)

In preferred embodiments of the supercritical water oxidation reactor, the reactor may preferably further comprise a plurality of individually controllable thermal elements arranged above the first vertical height ($h_1$).

Preferably, the one or more of the plurality of thermal elements may be arranged vertically side-by-side, preferably with a vertical distance between each element, at the wall or in the reactor body, such as inside the wall of the reactor.

Preferably, one or more of the plurality of thermal elements may be arranged vertically side-by-side, preferably with a vertical distance between each element, inside the cavity.

Preferably, a number of the thermal elements may be adapted to provide a heat flux into the cavity and the remaining thermal elements may be adapted to provide a heat flux out from the cavity.

Preferably, each thermal element may fully encircle the reactor body along a horizontal perimeter of the reactor body.

Preferably, one or more, such as all, of the thermal elements may be electrical heating elements and/or electrical cooling elements and/or may be Peltier elements and/or may be tubular heat exchangers configured for receiving a heating/cooling fluid.

In preferred embodiments of a supercritical water oxidation reactor, the reactor may further comprising a catalyst typically arranged above the first vertical height, said catalyst being selected from the group catalysts enhancing the oxidation process(es) in the reactor. Preferably, the catalyst may be arranged in front of and/or below the inlet of the distillate output connection.

In preferred embodiments of a supercritical water oxidation reactor, the reactor may further comprise a salt filter for filtering salt, if any, from the fluid leaving the reactor through the distillate output connection. Preferably, the salt filter may be arranged in front of and/or below the inlet of the distillate output connection.

Preferably, the salt filter may comprise a catalyst arranged in the salt filter to provide contact with the fluid leaving the reactor through the distillate output connection.

Preferably, the salt filter may be in the form of or comprising a screen, a cyclone, a moving bed filter or catalysts enhancing oxidation processes so as to speed-up of the oxidation processes taking place in the reactor.

In preferred embodiments of the supercritical water oxidation reactor, the reactor may further comprise an oxidation fluid input connection arranged at the lower end of the rector body for inputting into the cavity an oxidant.

In preferred embodiments of the supercritical water oxidation reactor, the inlet of the residue output connection may be arranged vertically moveable inside the cavity.

In preferred embodiments of the supercritical water oxidation reactor, the residue output connection may be configured to provide a flow path of a distance being longer than the first height so as to enhance heat exchange between the fluid flowing internally in the residue output connection and the fluid surrounding the residue output connection, said residue output connection being preferably coiled along a least a part of the residue output connection.

In preferred embodiments of the supercritical water oxidation reactor, the distillate output connection may be configured to provide a flow path of a distance being longer than the second height so as to enhance heat exchange between the fluid flowing internally in the distillate output connection and the fluid surrounding the distillate output connection, said distillate output connection being preferably coiled along a least a part of the distillate output connection.

In preferred embodiments of a supercritical water oxidation reactor, the reactor may further comprise an inner liner forming an inner cavity being open at an upper end thereof and comprising the aqueous fluid inlet connection at the lower end of the inner cavity, said inner liner may preferably be provided with dimensions providing a horizontal distance ($\Delta_1$) between an inner surface of the reactor body and an outer surface of the inner liner thereby defining a space there-between and the reactor further comprising a further distillate outlet connection in fluid communication with said defined space.

Preferably, the inner liner may be provided with dimensions providing a distance vertical ($\Delta_2$) between the bottom of the reactor body and a bottom of the inner liner thereby defining a space there-between, said space being in fluid communication with the further distillate outlet connection.

Preferably, the residue output connection may be arranged inside the inner liner.

Preferably, the distillate output connection may be arranged inside the inner liner. Preferably, the distillate output connection may comprise a coiled section encircling at least a section of the residue output connection.

Preferably, the inner liner has a upper rim, which upper rim may be arranged at or below the same vertical height ($h_2$) as the inlet of distillate output connection.

Preferably, a salt filter and/or a catalyst may be arranged at the upper end of the inner liner.

In preferred embodiments of the supercritical water oxidation reactor the reactor body comprising a reactor liner forming at least a part of the reactor body being in contact with the fluid inside the supercritical water oxidation reactor and may preferably be made from a material being resistant to chemical corrosion.

In a second aspect, the invention relates to a process for treating an aqueous fluid comprising organic and/or inorganic material, such as waste water, the process comprising feeding the fluid into a reactor according to the first aspect of the invention and controlling the heat flux through the reactor body by use of the thermal elements to obtain a vertical reference temperature profile in the reactor.

In preferred embodiments of the supercritical water oxidation process, the controlling of the heat flux through the reactor body may include:
 determining the temperatures by use of the temperature sensors;
 comparing the determined temperatures to the reference temperature profile, and
 at each position where a thermal element is located
  increase the heat content in fluid in the reactor at the specific location, if the temperature determined is lower than the reference temperature at the specific position, or
  decrease the heat content in the fluid in the reactor at the specific location, if the temperature determined is higher than the reference temperature at the specific position and/or
 adjusting the flow of organics into the reactor.

Further aspects and embodiments of the invention are presented below as well as in the accompanying claims.

BRIEF DESCRIPTION OF THE FIGURES

The present invention and in particular preferred embodiments thereof will now be described in greater details with reference to the accompanying figures. The figures show ways of implementing the present invention and are not to be construed as being limiting to other possible embodiments falling within the scope of the attached claim set.

DETAILED DESCRIPTION OF AN EMBODIMENT

Figure 1:
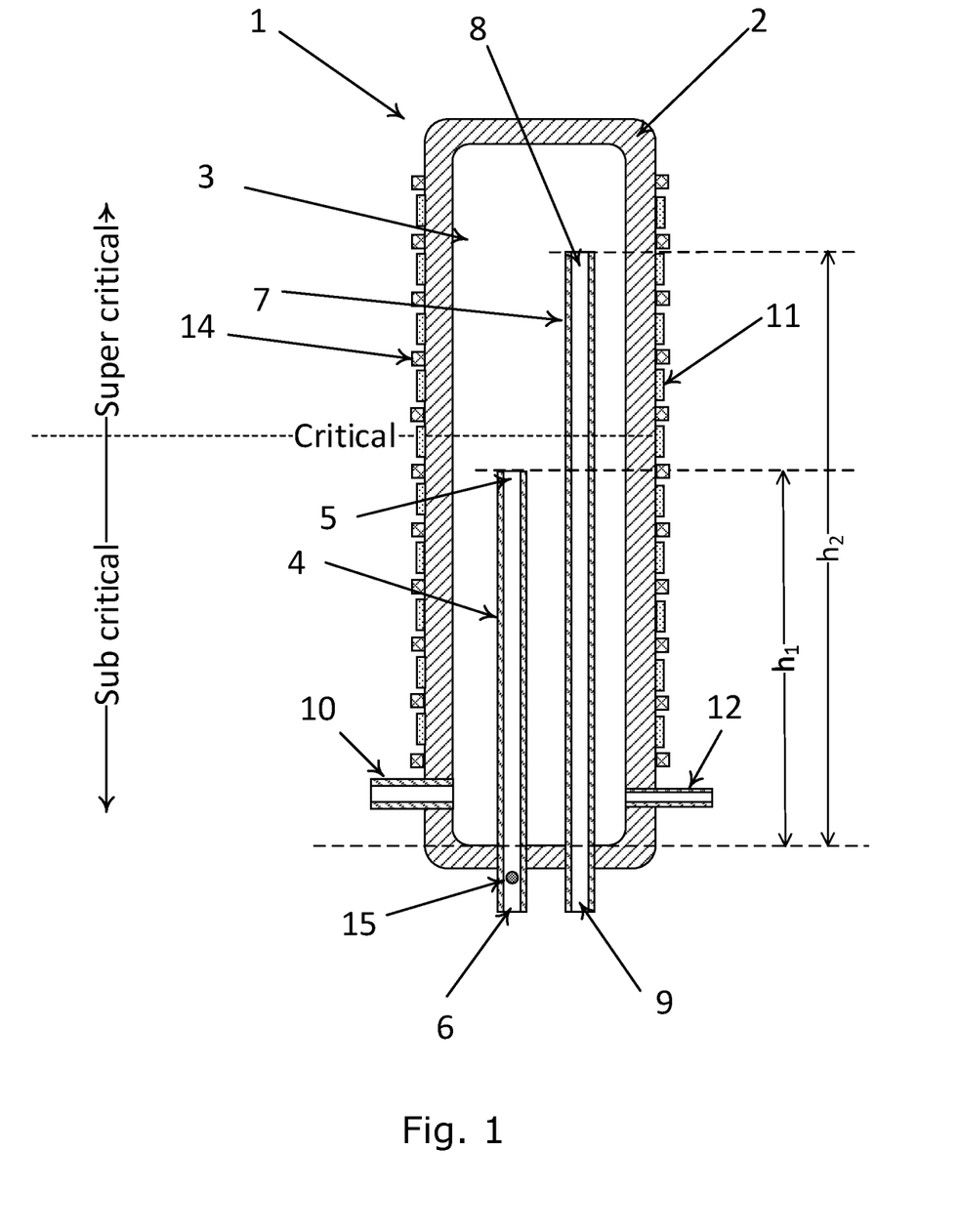
FIG. 1 schematically illustrates in a cross sectional view a reactor according to a first embodiment of the invention, FIG. 2 schematically illustrates in a cross sectional view a reactor according to a second embodiment of the invention in which the reactor further comprising a catalyst (and/or mechanical filter for trapping inorganic salt)

Reference is made to FIG. 1 illustrating schematically a supercritical water oxidation reactor 1 according to a preferred embodiment. The reactor 1 is illustrated as a cross sectional view and the reactor is typically in the form an elongate tubular element, such as a cylinder, extending in vertical direction, during use. The reactor is adapted to contain inside the reactor 1 an aqueous fluid below and above its supercritical state. Thus, as the supercritical state of the fluid is accompanied by a relatively high pressure and temperature, the reactor 1 is adapted by a suitable selection of material and thickness of the material so that the reactor can withstand the pressure and temperature.

The fluid typically comprising organic and/or inorganic material and, as disclosed herein, the reactor 1 is for providing a supercritical water treatment and/or supercritical water gasification of the fluid typically in manner where e.g. salt(s) precipitate when the fluid enters into a super critical phase. It is noted, that during operation, there will typically be a flow of fluid from the sub-critical phase to the super-critical phase as will be disclosed in further details below.

Accordingly, the reactor 1 of FIG. 1 comprises a reactor body 2 in the form of an elongate tubular element arranged, during use, with its longitudinal extension parallel to or substantially parallel to gravity, the reactor body 2 being closed at its upper and lower ends thereby defining a cavity 3 inside the reactor body 2.

The reactor 1 has a residue outlet connection 4 having an inlet 5 arranged at a first vertical height $h_1$ inside the cavity 3 and having an outlet 6 arranged outside the reactor body 2. The reactor 1 also has a distillate output connection 7 having an inlet 8 arranged at a second vertical height $h_2$ inside cavity 3 being higher than the first vertical height $h_1$ and having an outlet 9 arranged outside the reactor body 2. It is noted that the terms "inlet" and "outlet" refer to the preferred flow direction through the connections of the reactor during use.

As illustrated in the FIG. 1 (and in FIGS. 2-6) the residue output connection 4 extends from its inlet 5 downwardly towards the lower end of the reactor. Similarly, the distillate output connection 7 extends from its inlet 8 downwardly towards the lower end of the reactor. This provides a flow where feed enters into the reactor 1 at the lower end of the reactor 1 (through aqueous fluid inlet 10) and flows upwardly towards the upper end of the reactor 1. Residue is produced below (and at the salt mirror) which flow downwardly through the residue output connection 4. Distillate is present above the salt mirror and flows downwardly through the distillate output connection 7.

Further, liquid to be treated is to be fed into the reactor and to this, an aqueous fluid inlet connection 10 is arranged at the lower end, such as at the bottom of the rector body for inletting into the cavity 3 the aqueous fluid to be brought into and above its supercritical state. In the embodiment shown, the inlet connection 10 is shown at the side of reactor, however, the inlet connection 10 may also be arranged at the bottom of the reactor 1.

As presented in the above, an aim of the invention is to be able to control the temperature in at least a part of the vertical extension of the reactor, typically in a region above and below the inlet 5 of the residue outlet connection 4, and in order to do this, the reactor 1 comprises a plurality of individually controllable thermal elements 11 arranged below the first vertical height $h_1$. In FIG. 1, thermal elements 11 are arranged along the full length of the reactor, which is considered within the scope of the present invention.

In certain preferred embodiments, the thermal elements 11 are arranged only below the first vertical height and are used for heating and/or cooling the fluid below the first vertical height. Thus, in such embodiments, at least the thermal element(s) 11 arranged below the first vertical height $h_1$ is(are) configured to provide sufficient heat to fuel or cool the process. By fuel or heat the process is preferably meant that no further heat exchange in needed in order to keep the process running.

In still further embodiments, the thermal element(s) 11 is(are) configured for and/or used for cooling only at and/or below the first vertical height $h_1$.

As presented in the figures, the reactor 1 may further comprise a plurality of individually controllable thermal elements (11) arranged above the first vertical height $h_1$. The thermal elements 11 may be configured to provide a heat flux into and/or out from the reactor as presented below.

The thermal elements 11 are typically of a type allowing both addition of heat to the reactor and extraction of heat from the reactor. While the thermal elements 11 may be arranged at different location of the reactor 1, such as at or in the reactor body 2 and/or inside the cavity 3, it is generally preferred to provide such elements 11 on the outer wall of the reactor body. This has inter alia the advantage that they are arranged away from the harsh environment inside the cavity 3 and easily accessible for e.g. servicing. The thermal element 11 are configured to provide an individually controllable heat flux into/out from the cavity 3 so as to impose a vertical temperature profile on the fluid inside the cavity 3.

While the thermal element 11 can add heat to or extract heat from the fluid inside the cavity 3 individually, the amount of heat extracted or added are typically based on measurement of the temperature of the fluid inside the cavity 3, typically independently of each other.

The temperature measurements are carried out by use of a plurality of temperature sensors 14 arranged to measure a fluid temperature at a given height of the reactor. The temperature sensors 14 should typically at least be arranged to measure the temperature in a region above and below the inlet 5 of the residue outlet connection 4. In many instances, it is more practical to arrange the temperature sensors 14 on the outside of the reactor body 2 (as illustrated in FIG. 1) and in such cases, the temperatures measured may deviate slightly from the temperature of the fluid inside the reactor 1 due to a temperature gradient though the wall of the reactor body. However, it has been found that this difference may either be neglected or encountered for by use of e.g. the heat conductivity of the reactor wall which is often well known. Thus, as illustrated in FIG. 1, it is preferred to determine the temperature of the reactor body 2, at a plurality of different vertical positions, including a position above and a position below the first vertical height $h_1$. Although, temperature sensors 14 are illustrated in the figures herein to be applied along the full height of the reactor 1, it may be sufficient to have only temperature sensors 14 in a region above and below the first height $h_1$. One or more temperature sensor 14 may also be arranged at the top of the reactor 1

Figure 3:
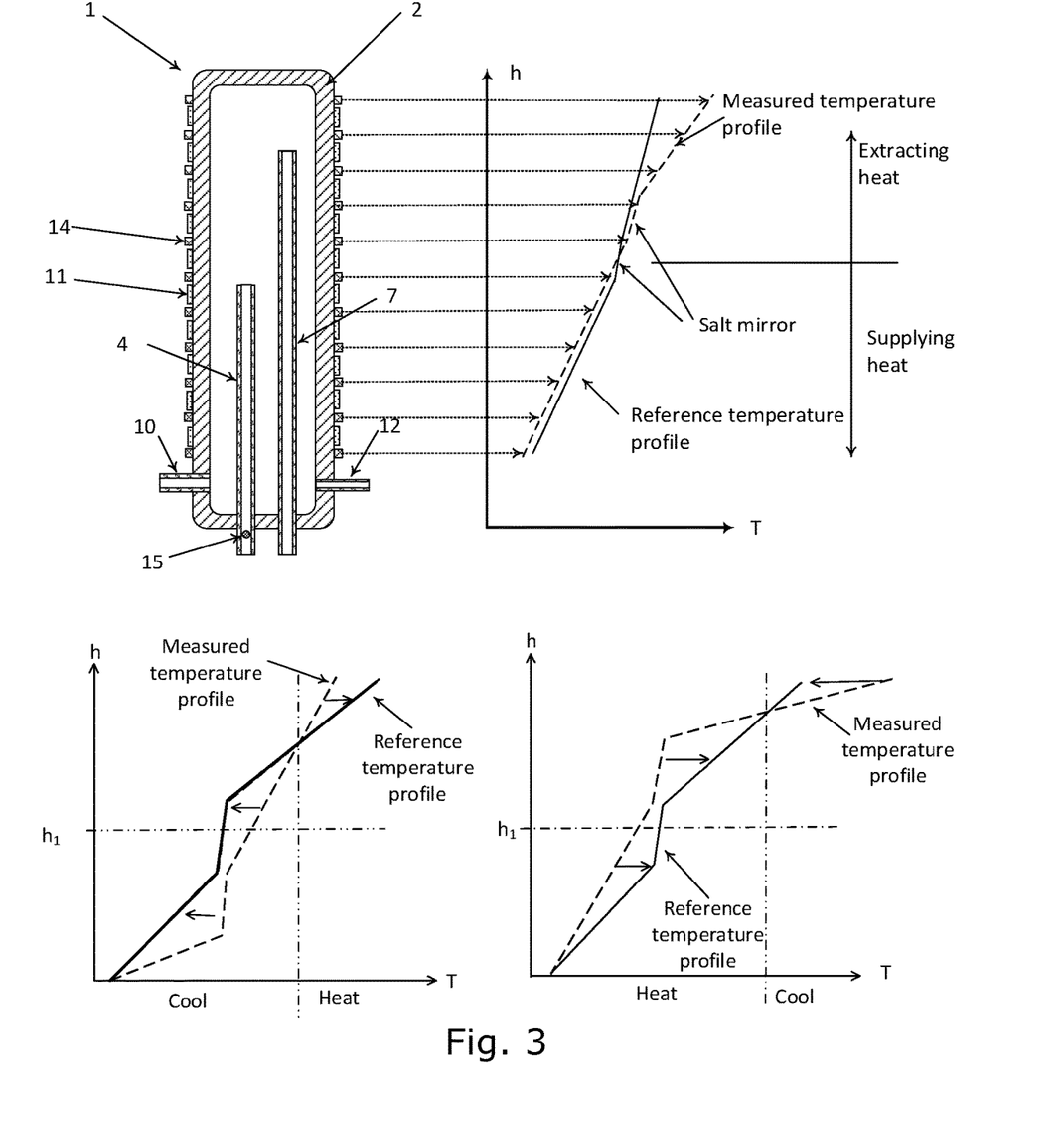
FIG. 3 is a schematically illustration of a control method according to a preferred embodiment of the invention, FIG. 4 schematically illustrates in a cross sectional view a reactor according to a further embodiment of the invention, FIG. 5 schematically illustrates in a cross sectional view a reactor according to a further embodiment of the invention, FIG. 6 schematically illustrates in a cross section view a reactor according to a further embodiment of the invention, FIG. 7 schematically illustrates in a cross sectional view a further embodiment, wherein a salt filter and/or a catalyst is(are) arranged at the upper end of the inner liner shown in FIG. 6.

That the temperature is determined above and below the first vertical height $h_1$ follows from the aim of controlling the position of the so-called salt mirror to be above the inlet of the residue outlet connection 5. As will be disclosed further e.g. with respect to FIG. 3, the position of the salt mirror is recognizable in a vertical temperature profile as a part of the profile where:

$$\frac{dT}{dh} < o$$

where o is a small number, T is the temperature and h is the height from the bottom Or said in another manner, the change in temperature with height is smaller than changes in temperature above and below the salt mirror. The salt mirror will also typically occur close to the critical temperature of water 374° C.

It is noted that although the fluid is moving around inside the cavity 3 of the reactor, the temperature of the fluid is considered to be equal along each horizontal cross section through the cavity 3. That this may be considered as an approximation can be seen e.g. in FIG. 3 where the salt mirror has a vertical extension of a substantive size, defining a zone where the fluid goes from sub-critical to super critical phase, which is due to the motion of the fluid inside the zone of reactor cavity 3.

As an alternative to, or in combination with the temperature sensors 14, the reactor 1 may comprise a salt concentration sensor 15 arranged to measure the salt concentration in the fluid flowing through the residue output connection 4. This salt concentration sensor 15 may be used to determine whether the salt mirror is above or below the inlet 5 of the residue outlet connection 4 as if the salt mirror is above the inlet 5, salt will precipitate above the inlet 5 and find its way to the salt concentration sensor 15, whereas if the salt mirror is located below the inlet 5, salt will precipitate below the inlet 5 and at least a less amounts of salt or no salt at all will find its way to the salt concentration sensor 15. As a moving upwardly or downwardly of a salt mirror can be effected by changing the heat content in the fluid (e.g. by considering change in specific heat content as $\Delta Q=C*\Delta T$, where specific refers to "per mass unit") below or above the salt mirror, this can be used as a control mechanism by increasing the heat in fluid below the inlet 5 by use of the thermal elements 11.

It is noted that it generally preferred, that at least the thermal element(s) 11 arranged below the first vertical height $h_1$ is(are) configured to provide sufficient heat to fuel the process.

In the preferred embodiment shown in FIG. 1, the one or more of the plurality of thermal elements 11 are arranged vertically side-by-side preferably with a vertical distance between each element 11, at the wall. The thermal elements 11 may also be arranged in the reactor body 2. Alternatively, or in combination with the above, the one or more of the plurality of thermal elements 11 are arranged vertically side-by-side, preferably with a vertical distance between each element 11, inside the cavity 3. The number of thermal elements 11 used is often based on a requirements as to which degrees a control is aimed at; to this, if a high degree of control is the aim, a relatively higher number of elements 11 are used with less space in between than if a less degree of control is aimed at.

The temperature of the fluid inside the reactor is, in general, determined by four contributions, namely:
heat produced by reaction(s) in the fluid
heat used by the reaction(s) in the fluid
heat extracted from the fluid to the outside, and
heat added to the fluid from the outside.

As all these—in total four—ways, the temperature of the fluid can be altered, there is preferably a need for both providing a heat flux into the cavity and for providing a heat flux out from the cavity to control the temperature inside the cavity 3. In order to achieve this, the reactor 1 shown in FIG. 1 may have a number of the thermal elements 11 which are adapted to provide a heat flux into the cavity 3 and the remaining thermal elements 11 are adapted to provide a heat flux out from the cavity 3. It is noted, that depending on the type of thermal elements 11, a thermal element 11 which may provide selectively both a heat flux into and a heat flux out from the cavity can be used. The thermal elements 11 used are typically identical from a mode of operation point of view (heat flux in or out) but may differ from each other from a capacity point of view (watts per element).

It is often preferred to have a as constant as possible temperature along horizontal cross sections of the reactor and in such cases, each thermal element 11 preferably fully encircles the reactor body 2 along a horizontal perimeter of the reactor body 2. This means that along a horizontal perimeter of the reactor body 2, there are preferably no open areas not covered by the thermal element 11. Similarly, if the thermal elements 11 are arranged in the reactor body and/or inside the reactor, the thermal elements also encircles along a horizontal perimeter of the reactor body 2. However, thermal elements 11 may also be applied so as to cover a horizontal and vertical section of the reactor only.

One or more, such as all, of the thermal elements 11 may be selected from:
electrical heating elements,
electrical cooling elements,
Peltier elements
tubular heat exchangers configured for receiving a heating/cooling fluid.

It has been found in connection with the present invention that a catalytic material present in the supercritical region may have an advantageous effect in processing water with contaminants. Thus, a reactor according to the present invention may preferably further comprising a catalyst 13 arranged above the first vertical height, said catalyst being selected from catalysts enhancing oxidation processes so as to speed-up of the oxidation processes taking place in the reactor.

In the embodiment shown in FIG. 2, the catalyst 13 is arranged in front of and/or below the inlet 8 of the distillate output connection 7 in a manner so that fluid leaving the reactor through inlet 8 comes into contact with the catalyst 13. The catalyst is typically a heterogeneous catalyst, e.g. in the form of pellets or a porous structure providing a flow path past the catalyst towards the inlet 8. Alternatively, or in combination thereto, the catalyst may be applied to surfaces of a flow structure e.g. a filter (as disclosed below).

Although the invention aims at providing a salt-free distillate, some salt may be present in the distillate. Other salts may bond to organic matter and is released in the upper part of the reactor after oxidation. Such salts may need to be filter off in order to avoid clogging of the distillate output connection 7.

In other situations, the salt mirror is temporarily above the inlet 8 of the distillate output connection 7 resulting in that salt precipitate above the inlet 8. To prevent salt from entering into the distillate output connection 7, a salt filter 16 may be arranged at the inlet 8 of the distillate output connection 7. Thus, a reactor may preferably further comprise a salt filter 16 for filtering salt, if any, from the fluid leaving the reactor through the distillate output connection 7. As illustrated in FIG. 2, the salt filter 16 may be arranged in front of and/or below the inlet 8 of the distillate output connection 7.

As the salt filter 16 provides a flow path into the distillate output connection 7, the salt filter may advantageously comprise a catalyst arranged in the filter 16 to provide contact with the fluid leaving the reactor 1 through the distillate output connection 7, for instance the surface(s) of the filter 16 may be coated at least partly with or made at least partly from a catalytic material.

The salt filter may for example be in the form of or comprising a screen, a cyclone, a moving bed filter, a plate filter or combinations thereof.

The filters 16 may be cleaned from salts by lowering the temperature in the reactor in the region of the salt filter to sub-critical condition so as to dissolve the salts in the fluid, or the salt filter may be cleaned mechanically e.g. by scraping, shaking or the like or by back-flushing the filter.

Figure 2:
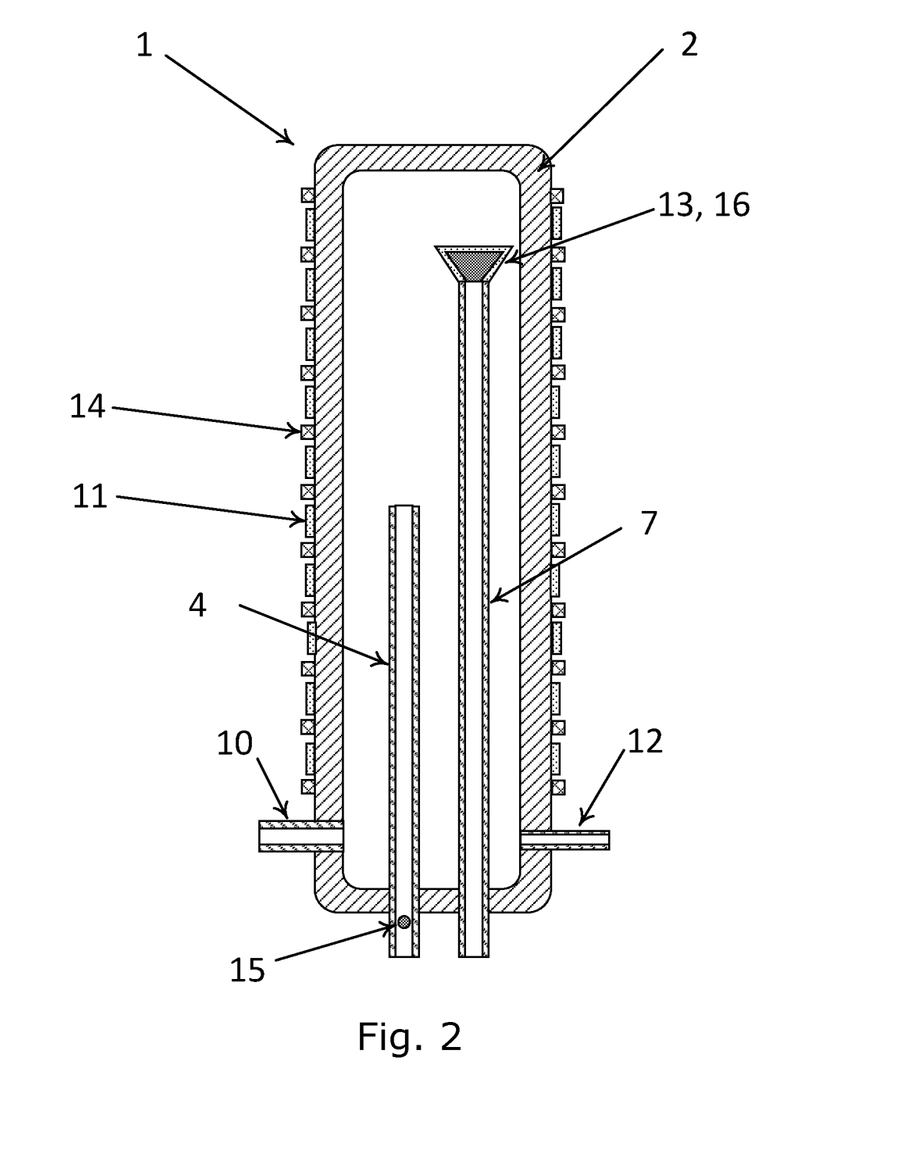

Some of process which suitable can be carried out by the present invention may require an addition of oxygen (or other fluids) and to this the reactor 1 may further comprise an oxidation fluid input connection 12, preferably arranged at the lower end of the rector body for inputting into the cavity 3 an oxidant (see e.g. FIGS. 1 and 2). If other fluids than oxygen is to be fed into the reactor, the oxidation fluid input connection 12 can serve this purpose. The oxidant may be a gas of a liquid comprising or consisting essentially of oxygen. It is noted that due to the elevated pressure inside the reactor, it may be needed to pump the oxidant into the cavity 3 which pumping and/or infeed may or may not result in phase change of the oxidant.

The aqueous fluid inlet connection 10 and the oxidation fluid inlet connection 12 may instead of being shown in the figures as two separate inlets being provided as a single inlet and the two fluid (feed and oxidation fluid or other fluids) may be mixed outside the reactor 1; this may e.g. be accomplished by a T-pipe where the two fluids are fed into and mixed and fed from the T-pipe into the reactor 1.

It has further been found that although the position of the salt mirror can be altered by use of the thermal element 11, it can be beneficial to be able to move the position of the inlet 5 of the residue output connection. To this, the reactor may be equipped with the inlet 5 of the residue output connection 4 being arranged vertically moveable inside the cavity 3. This may be provided e.g. by the residue output connection 5 has a telescopic part inside the cavity 3 and/or the with the output connection 5 being slideable arranged in vertical direction in the reactor 1.

Reference is made to FIG. 3 introducing inter alia a reference temperature profile and a measured temperature profile. Such temperature profiles represents respectively a reference temperature profile or the actual temperature profile of the fluid inside the reactor as a function of the height (where zero height is the bottom of the reactor 1). The reference temperature can be seen as an temperature profile aimed at during use of the reactor and is used in a comparison with actual measured temperature to determine on control measures to be taken if deviations exists between the measured and reference temperatures. Differences between reference temperatures and measured temperatures are used to decide whether the temperature is to be increased or lowered at a given height in order to achieve a match between reference temperature profile and measured temperature profile. A threshold may be introduced in the sense that a difference should be above a certain threshold before changes are imposed e.g. in order to avoid instabilities in the control. As disclosed above, the heat flux is controlled by the thermal elements 11 and the temperatures are determined by the temperature sensors 14.

Accordingly, in a process for treating an aqueous fluid comprising organic and/or inorganic material, such as waste water or industrial waste water in general, the process comprising feeding the fluid into a reactor as disclosed herein, and controlling the heat flux through the reactor body 2 by use of the thermal elements (11) to obtain a horizontal reference temperature profile in the reactor (1).

The controlling of the heat flux through the reactor body typically includes:
  determining the temperatures by use of the temperature sensors 14;
  comparing the determined temperatures to the reference temperature profile, and
  at each position where a thermal element 11 is located
  increase the heat content in fluid in the reactor at the specific location, if the temperature determined is lower than the reference temperature at the specific position, or
  decrease the heat content in the fluid in the reactor at the specific location, if the temperature determined is higher than the reference temperature at the specific position and/or
  adjusting the flow of organics into the reactor.

The adjustment of the flow of organics into the reactor typically refers to that the amount of organic material that is introduced into the reactor per time unit is adjusted. As the process taken place in the reactor are mainly exothermic a "fuel" is the organic material, a change in the amount of fuel available will have an influence in the temperature inside the reactor.

The specific heat content (per mass unit) may be approximated by $\Delta Q = C(T - T_o)$ where Q is the heat content, C is the specific heat capacity T is the temperature and $T_o$ is a zero point e.g. 0 Kelvin.

As illustrated in FIG. 3, upper right figure, the measured temperature profile is shown together with the reference temperature profile and discrepancies are identified since:
  the reference temperatures are higher than the measured temperatures below the salt mirror, and
  the measured temperatures are higher than the reference temperatures above salt mirror.

The actual state of operation of the reactor is indicated as "supplying heat" and "extracting heat" respectively above and below the point where the two temperature profiles cross each other.

FIG. 3 lower part illustrates two different control situations. To the right in FIG. 3, a situation as illustrated in FIG. 3 upper right figures is show. As illustrated, the control involves cooling of the fluid above the crossing of the two temperature profiles and heating below that point. In implementing these measures, it may be necessary to take into account whether the process taking place inside the reactor at a given position is exothermic or not and where an exothermic process takes place, as e.g. heating of an exothermic process may be accomplished by lowering extraction of heat from the fluid. In FIG. 3 lower part to the left, the opposite situation is shown together with the measures to be taken according to preferred embodiments of the invention.

In some situations, it may be practical to apply changes based on the result of one or more previous heat flux changes imposed. This could for instance be implemented by considered the time wise derivative of the difference between reference and measured temperature and if the changes growth in time, then the applied change in heat flux is inadequate and should be changed with opposite change, e.g. if $$\frac{\Delta T_{t+\Delta t} - \Delta T_t}{\Delta t} > 0 \text{ and } H_{t+\Delta t} - H_t > 0 \text{ then } H_{2\Delta t} < H_t$$

where $$\Delta T = T^R - T^M$$

T is the temperature, superscript R refers to reference temperature profiled, M refers to measured temperature profiled, H is the heat flux and t is time.

Figure 4:
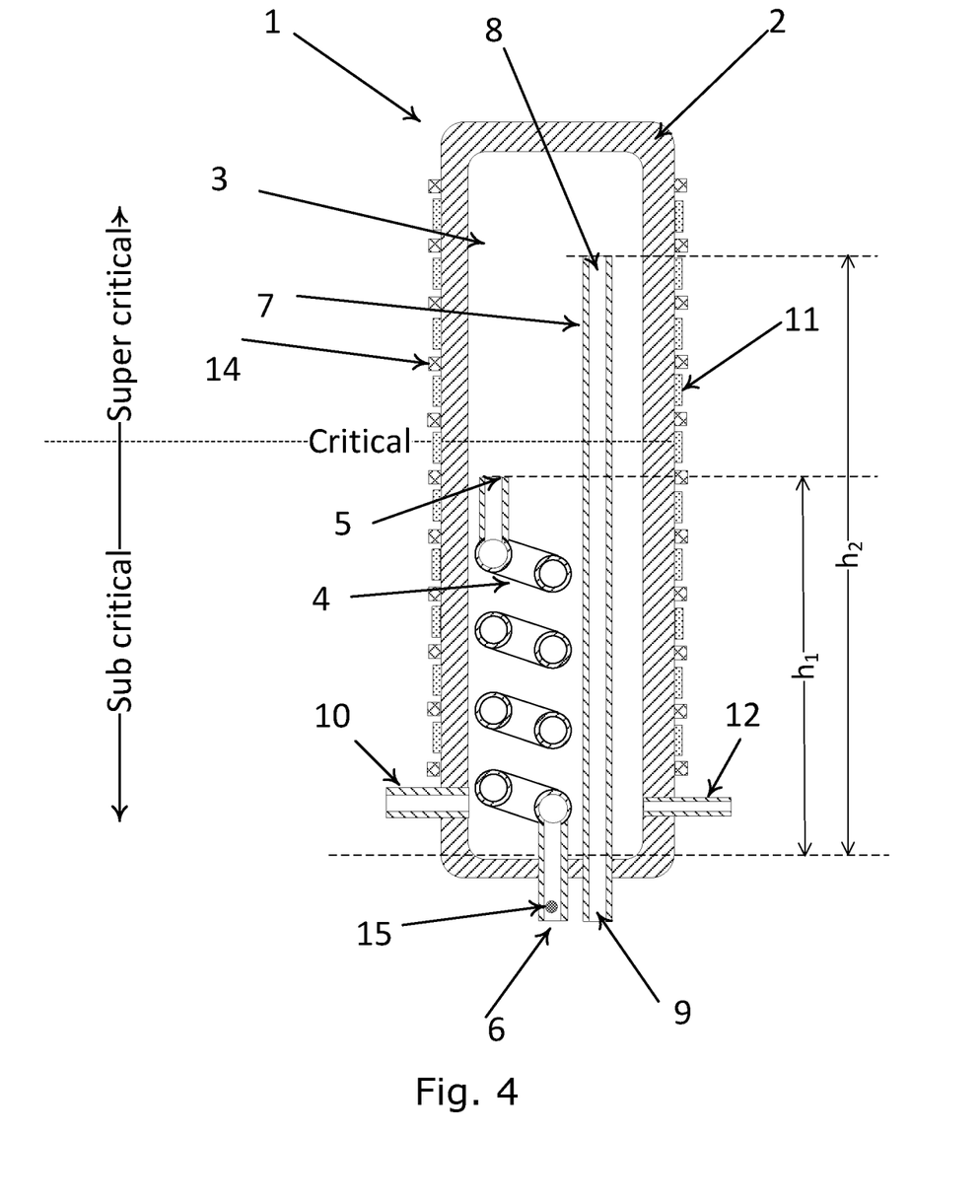

Reference is made to FIG. 4 schematically illustrates in a cross section view a reactor according to a further embodiment of the invention. Compared with the embodiment, the residue output connection 4 has been shaped so as to increase heat transfer between the fluid flowing internally in the residue output connection and the fluid flowing outside the residue output connection 4. In the embodiment shown in FIG. 4, the increase of heat transfer has been provided by shaping the residue output connection 4 as a coil which provides a relatively larger surface to transfer heat through as well as providing a flow pattern providing a higher transfer coefficient (h).

Although not disclosed, the distillate output connection may also—or alternatively to increasing the heat transfer of the residue output connection—be shaped to increase heat transfer, e.g. by shaping the distillate output connection as a coil similarly to the illustrated coil of the residue output connection.

Thus, the reactor of FIG. 4 resides inter alia in that the residue output connection 4 is configured to provide a flow path of a distance being longer than the first height, so as to enhance heat exchange between the fluid flowing internally in the residue output connection and the fluid surrounding the residue output connection, which is provided in a preferred embodiment by the residue output connection 4 is coiled along a least a part of the residue output connection.

Figure 5:
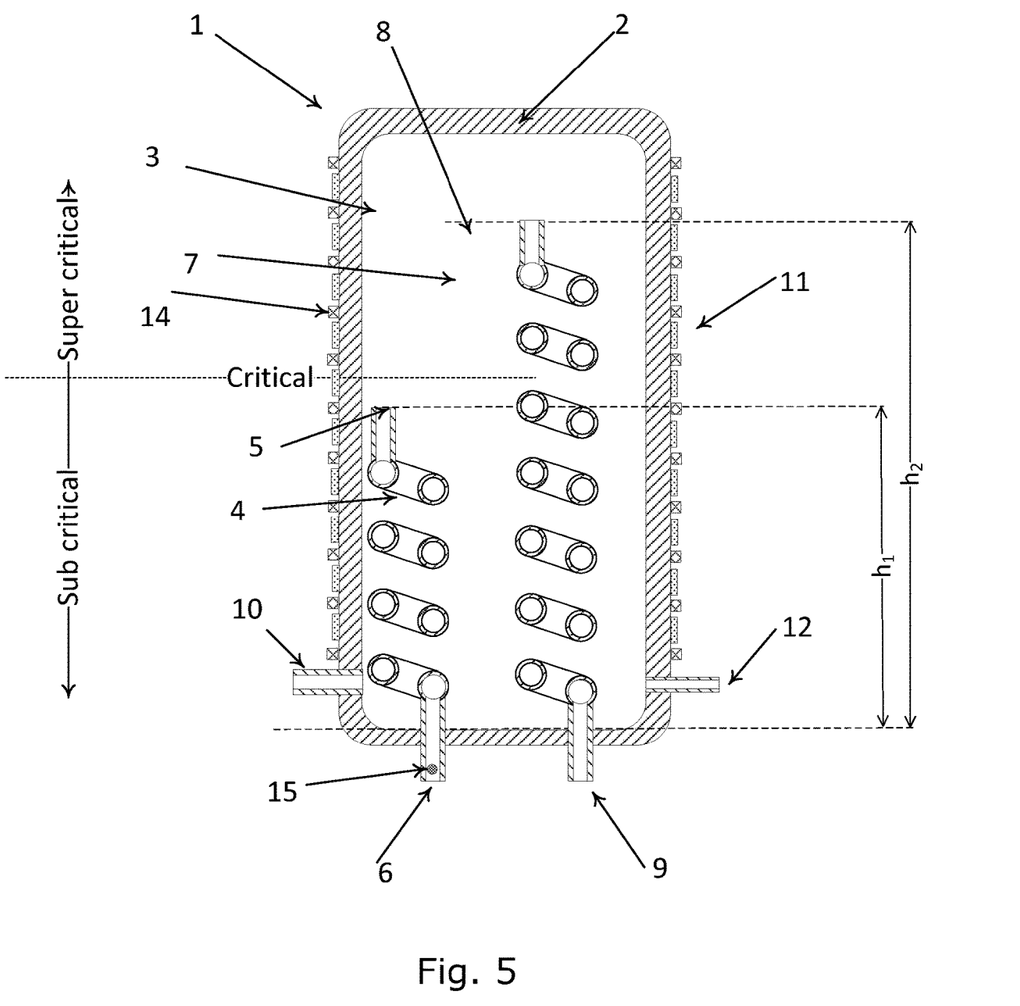

Further, the distillate output connection 7 may further or alternatively be configured to provide a flow path of a distance being longer than the second height, so as to enhance heat exchange between the fluid flowing internally in the distillate output connection and the fluid surrounding the distillate output connection, which may be provided by the distillate output connection 7 is coiled along a least a part of the distillate output connection. This is illustrated in FIG. 5 illustrating an embodiment in which both the residual output connection 4 as well as the distillate output connection is coiled. It is noted that the coiled regions may differ from what is disclosed in FIGS. 4 and 5.

Figure 6:
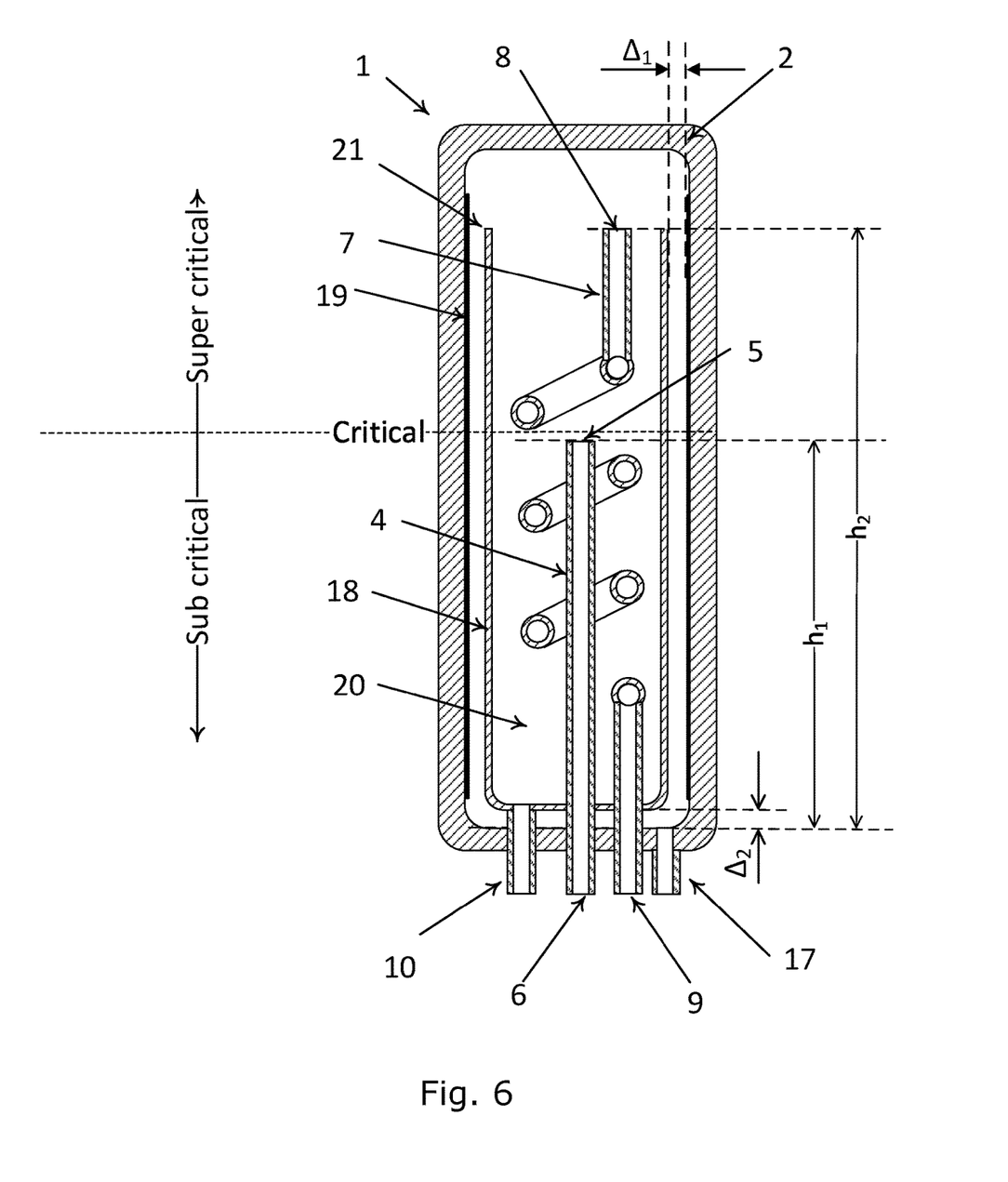

Reference is made to FIG. 6 schematically and in cross sectional view illustrates a further embodiment of a super critical water oxidation reactor 1 (SCWO-reactor 1). In the illustration depicted in FIG. 6, the thermal elements 11 as well as the temperature sensors 14 (not illustrated) are arranged as disclosed e.g. in relation to FIGS. 1, 2, 4 and 5.

In the embodiment shown in FIG. 6, SCWO-reactor 1 comprises an inner liner 18 forming an inner cavity 20 being open at the upper end and comprising the aqueous fluid inlet connection 10 at the lower end of the inner cavity. As illustrated the aqueous fluid inlet connection 10 extends from the outside the SCWO-reactor 1 and to the interior of the inner cavity 20.

The inner liner 18 is made from a fluid impermeable material such as metal, and as illustrated the inner liner 18 is provided with dimensions providing a horizontal distance $\Delta_1$ between the inner surface of the reactor body 2 and the outer surface of the inner liner 18 defining a space there between as well as a vertical distance $\Delta_2$ between the bottom of the reactor body 2 and the bottom of the inner liner 18 defining a space there between. As will become apparent from the following disclosure, these distances provides flow passages inside the SCWO-reactor 1. It is noted that the vertical distance $\Delta_2$ may be zero, meaning the inner liner 18 extend to and abut the bottom of the reactor body 2, or the bottom of the inner liner 18 is constituted by the inner bottom surface of the reactor body 2; in later case, it may be preferred to provide a fluid sealing between the inner line 2 and the inner bottom surface of the reactor body 2. When the vertical distance $\Delta_2$ is zero, the outgoing distillate will flow around the tubular gap between the liners 18 and 19 (wall of reactor body if no line 19 is provided) and communicate with the further distillate outlet 17.

In FIG. 6, a reactor liner 19 is also illustrated. This reactor liner 19 forms at least a part of the reactor body 2 of SCWO-reactor being in contact with the fluid inside the reactor and is preferably made from a material being resistant to chemical corrosion The position of the critical point (salt mirror position) above which the fluid is super critical and below which the fluid is sub critical is also illustrated in FIG. 6.

The residue output connection 4 is arranged inside the inner liner 18 and the inlet of the residue output connection 5 is arranged at a vertical height $h_1$ that is below the position of the critical point during normal operation.

The distillate output connection 7 is also arranged inside the inner liner 18 although with its inlet 8 of the residue output connection 7 arranged at the vertical height $h_2$, that is above the position of the critical point during normal operation. In the embodiment shown in FIG. 6, the distillate output connection 7 comprising a coiled section encircling the residue output connection 4 and acting as a heat exchanger heating the aqueous fluid entering into the inner cavity 20 formed by the inner liner 18. At the bottom of the SCWO-reactor 1, the coiled section of the distillate output connection proceed into a straight section extending to the outside of the SCWO-reactor 1 and forming the outlet 9 of the distillate output connection 7.

As also illustrated in FIG. 6, the upper rim 21 of the inner liner 18 is arranged at the same vertical height $h_2$ as the inlet 8 of distillate output connection 7, although the height at which the upper rim 21 may be offset, typically downward to a position above the position at which the fluid is critical. That is, the upper rim 21 is positioned to be in supercritical zone.

During normal operation, the aqueous liquid is fed into the reactor 1 through the aqueous fluid inlet connection 10 and enters thereby into the inner cavity 20 formed by the inner liner 18. The aqueous fluid is heated (or cooled) by the thermal elements 11 and/or by the fluid flowing downwardly inside the distillate output connection 7. As described herein, the aqueous fluid is heated so that the fluid becomes critical at a vertical position above $h_1$ and below $h_2$ thereby produces a residue flowing into the residue output connection 4. The distillate (produced by the fluid becomes super critical) moves upwardly in the super critical region. The distillate has two flow paths out of the SCWO-reactor 1 namely through the distillate output connection 7, and through the space defined between the inner liner 18 and the wall liner 19 (provided by the distance $\Delta_1$) as well as the space below the inner liner 18 and the bottom of the reactor (provided by the distance $\Delta_2$) forming a flow path towards a further distillate outlet 17.

It is noted that the fluid flowing in the space between the inner liner 18 and the wall liner 19 will also exchange heat with the fluid inside the inner liner 18, and the heat exchange rate may be controlled e.g. by controlling the mass flow in said space. Further, since the flow in the space between the inner liner 18 and the wall line 19 is highly controllable (e.g. by regulating the flow out of the further distillate outlet 17 by a valve mechanism), this flow may be controlled in accordance with specific needs and/or applications.

By equipping the SCWO-reactor 1 with an inner liner 18, the fluid contacting the reactor wall, e.g. the wall liner 19, may be restricted to distillate being less corrosive than the residue. This has the advantage that the reactor body 2 can be made with the aim to withstand the pressure inside the reactor, and the inner liner 18 can be designed to withstand corrosion (or other material degradation processes). Further, the inner liner 18 can be replaced without the need for replacing parts of the reactor body 2, whereby the inner liner 18 can be made as a replaceable insert. Further, in case the salt mirror becomes located below the inlet 5 of the residue output connection 4, the salt being released will be kept inside the inner cavity, thereby not contacting the wall of the reactor body 2.

Since the inner liner 18 introduces a space in between the inner liner 18 and the wall of the reactor body, it may be necessary to pump pure water into the space for flushing purposes, which flushing will typically be performed with a flow going from bottom towards the top of the SCWO-reactor 1. In such cases, the further distillate outlet 17 can be used as an inlet for the flushing liquid, and/or a separate inlet dedicated for introducing the flushing liquid can be arranged in the reactor 1.

As disclosed in connection with FIG. 2, the embodiment shown in FIG. 6 may also comprise a salt filter 16, which may be arranged in front of and/or below the inlet 8 of the distillate output connection 7. The salt filter 13 may for example be in the form of or comprising a screen, a cyclone, a moving bed filter, a plate filter or combinations thereof.

As also illustrated in connection with FIG. 2, a catalyst 13 may arranged in front of and/or below the inlet 8 of the distillate output connection 7 in the embodiment of FIG. 6 in a manner so that fluid leaving the reactor through inlet 8 comes into contact with the catalyst 13. The catalyst is typically a heterogeneous catalyst, e.g. in the form of pellets or a porous structure providing a flow path past the catalyst towards the inlet 8. Alternatively, or in combination thereto, the catalyst may be applied to surfaces of a flow structure e.g. a filter. The catalyst being selected from the group catalysts enhancing the oxidation process(es) in the reactor.

Figure 7:
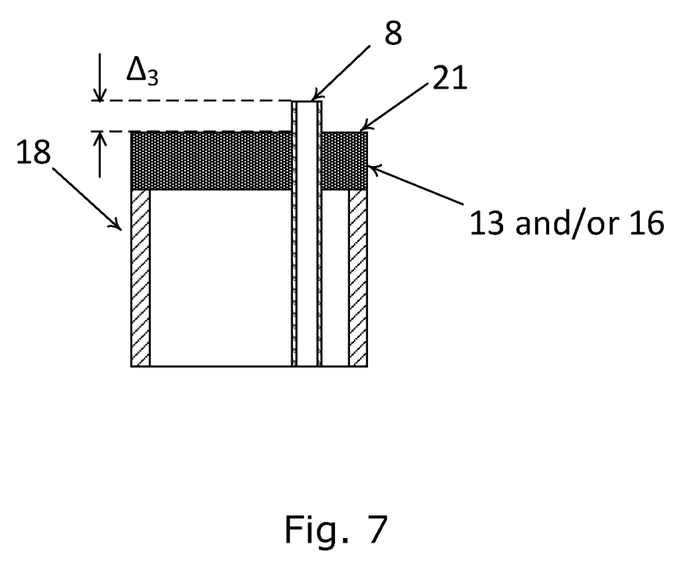

In a further embodiment, the salt filter 16 and/or the catalyst 13 may be arranged at the upper end of the inner liner 18. This is schematically illustrated in FIG. 7 in which an upper section of the inner liner 18 is depicted. As illustrated in FIG. 7 the upper rim 21 is in such embodiments preferably formed by an upper rim of the salt filter 13 and/or catalyst 16. It may be preferred to offset the upper rim 21 downwardly relatively to the inlet 8 of the distillate output connection 7 by a distance $\Delta_3$ which distance is preferably selected so that the upper rim 21 is located in the super critical zone.

In addition, the embodiment shown in FIG. 6 may also comprise an oxidation fluid input connection 12 (not illustrated) arranged as illustrated e.g. in connection with FIG. 2. A Salt concentration sensor 15 may also be arranged to measure the salt concentration in the residue (as disclosed herein).

Further, in the embodiments disclosed herein, typically only a single output connection (7, 4) is disclosed, however, a number of such output connections may be arranged, typically in parallel, in the SCWO-reactor.

Example

The following example illustrates the treatment of landfill leachate by a reactor of the present invention. Prior to the treatment, the leachate was pre-treated with a mechanical filter and an ion exchanger, and then concentrated using reverse osmosis (RO). The composition of the resulting concentrated leachate is shown in Table 1.

The concentrated leachate from the RO unit was pressurised to 250 bar and fed to the reactor simultaneously with pressurised air, where the organic compounds and ammonium were oxidized while the inorganic salts and heavy metals were separated as a concentrated salt residue (concentrate). The reactor comprised a heat exchanger consisting of a helically coiled tube in the lower region of the reaction zone, a linear tube in the intermediate zone, a helically coiled tube in the upper zone and a linear tube in the top zone. Reactor retention times were about 30-60 seconds.

The compositions of the distillate and the concentrate are also shown in Table 1. The COD value of the outgoing distillate was reduced 99.8%, while the ammonium content was reduced 99.999% compared to the ingoing concentrated leachate.

Almost all of the inorganic salts in the leachate were concentrated and extracted from the reactor. Depending on the composition of the inlet leachate, this concentrate can be mixed into the final product stream or destroyed at a waste treatment plant. The ammonium-N content in the concentrate can, if necessary, be further reduced from 120 mg/L to 30 mg/L by adding chemicals to the process.

TABLE 1

|  | Concentrated leachate from RO | Distillate, SCWO | Concentrate, SCWO |
|---|---|---|---|
| Volume (L) | 200 | 180 | 20 |
| COD (mg/L) | 5600 | 9 | 260 |
| TOC (mg/L) | 1300 | 3 | Na |
| NH4 +− N (mg/L) | 1900 | 0 | 120 |
| pH | 8 | 6 | 7 |
| ° dH | 1 | <1 | 6.5 |
| Conductivity (mS/cm) | 40 | 0.4 | ~250 |

LIST OF REFERENCE SYMBOLS USED 1 supercritical water oxidation reactor
2 a reactor body
3 cavity 3 inside the reactor body 2
4 residue output connection 4
5 inlet of residue output connection 4
6 outlet of residue output connection
7 distillate output connection
8 inlet of distillate output connection
9 outlet of distillate output connection
10 aqueous fluid inlet connection
11 thermal element
12 oxidation fluid input connection
13 catalyst (and/or filter element)
14 temperature sensor
15 salt concentration sensor
16 salt filter
17 further distillate outlet
18 inner liner
19 reactor liner
20 inner cavity
21 upper rim Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A supercritical water oxidation reactor (1) adapted to contain inside the reactor (1) an aqueous fluid below and above its supercritical state, said fluid comprising organic and/or inorganic material, wherein the reactor (1) comprising:

a reactor body (2) in the form of an elongate tubular element arranged, during use, with its longitudinal extension parallel to or substantially parallel to gravity, the reactor body (2) being closed at its upper and lower ends thereby defining a cavity (3) inside the reactor body (2);

a residue output connection (4) having an inlet (5) arranged at a first vertical height ($h_1$) inside the cavity (3) and having an outlet (6) arranged outside the reactor body (2), said residue output connection (4) extends from its inlet (5) downwardly towards the lower of the reactor;

a distillate output connection (7) having an inlet (8) arranged at a second vertical height ($h_2$) inside cavity (3) being higher than the first vertical height ($h_1$) and having an outlet (9) arranged outside the reactor body (2), said distillate output connection (7) extends from its inlet (8) downwardly towards the lower end of the reactor;

an aqueous fluid inlet connection (10) arranged at the lower end of the reactor body for inletting into the cavity (3) the aqueous fluid to be brought into and above its supercritical state, a plurality of individual controllable thermal elements (11), at least some of the plurality of thermal elements (11) are arranged below the first height ($h_1$) in the reactor body (2) and/or inside the cavity (3) and being adapted to provide an individually controllable heat flux into/out from the cavity (3) so as to impose a vertical temperature profile on the fluid inside the cavity (3), and a plurality of temperature sensors (14) arranged to measure a fluid temperature, or a temperature of the reactor body, at a plurality of different vertical positions, including a position above and a position below the first vertical height ($h_1$) and/or a salt concentration sensor (15) arranged to measure the salt concentration in the fluid flowing through the residue output connection (4).

2. A supercritical water oxidation reactor according to claim 1, wherein at least the thermal element(s) (11) arranged below the first vertical height ($h_1$) is(are) configured to provide sufficient heat to fuel or to cool the process.

3. A supercritical water oxidation reactor according to claim 1, wherein the thermal element(s) (11) is(are) configured for and/or used for cooling only at and/or below the first vertical height ($h_1$).

4. A super critical water oxidation reactor according to claim 1, wherein the plurality of individually controllable thermal elements (11) comprises at least some thermal elements (11) arranged above the first vertical height ($h_1$).

5. A supercritical water oxidation reactor according to claim 1, wherein the plurality of thermal elements (11) are arranged vertically side-by-side, optionally with a vertical distance between each element (11), at the wall or in the reactor body.

6. A supercritical water oxidation reactor according to claim 1, wherein one or more of the plurality of thermal elements (11) are arranged vertically side-by-side, optionally with a vertical distance between each element (11), inside the cavity (3).

7. A supercritical water oxidation reactor according to claim 1, wherein a number of the thermal elements (11) are adapted to provide a heat flux into the cavity (3) and the remaining thermal elements (11) are adapted to provide a heat flux out from the cavity (3).

8. A supercritical water oxidation reactor according to claim 1, wherein each thermal element (11) fully encircles the reactor body (2) along a horizontal perimeter of the reactor body (2).

9. A supercritical water oxidation reactor according to claim 1, wherein one or more, or all, of the thermal elements (11) are electrical heating elements and/or electrical cooling elements and/or are Peltier elements and/or are tubular heat exchangers configured for receiving a heating/cooling fluid.

10. A supercritical water oxidation reactor according to claim 1, wherein the reactor further comprising a catalyst (13) arranged above the first vertical height, said catalyst enhancing the oxidation process(es) in the reactor.

11. A supercritical water oxidation reactor according to claim 1, wherein the catalyst (13) is arranged in front of and/or below the inlet (8) of the distillate output connection (7).

12. A supercritical water oxidation reactor according to claim 1, wherein the reactor further comprising a salt filter (16) for filtering salt, if any, from the fluid leaving the reactor through the distillate output connection (7).

13. A supercritical water oxidation reactor according to claim 12, wherein the salt filter (16) is arranged in front of and/or below the inlet (8) of the distillate output connection (7).

14. A supercritical water oxidation reactor according to claim 12, wherein the salt filter comprising a catalyst arranged in the salt filter to provide contact with the fluid leaving the reactor through the distillate output connection (7).

15. A supercritical water oxidation reactor according to claim 12, wherein the salt filter is in the form of or comprising a screen, a cyclone, a moving bed filter or catalysts enhancing oxidation processes so as to speed-up of the oxidation processes taking place in the reactor.

16. A supercritical water oxidation reactor according to claim 1, further comprising an oxidation fluid input connection (12) arranged at the lower end of the rector body for inputting into the cavity (3) an oxidant.

17. A supercritical water oxidation reactor according to claim 1, wherein the inlet (5) of the residue output connection (4) is arranged vertically moveable inside the cavity (3).

18. A supercritical water oxidation reactor according to claim 1, wherein the residue output connection (4) is configured to provide a flow path of a distance being longer than the first height so as to enhance heat exchange between the fluid flowing internally in the residue output connection and the fluid surrounding the residue output connection said residue output connection (4) being preferably coiled along a least a part of the residue output connection.

19. A supercritical water oxidation reactor according to claim 1, wherein the distillate output connection (7) is configured to provide a flow path of a distance being longer than the second height so as to enhance heat exchange between the fluid flowing internally in the distillate output connection and the fluid surrounding the distillate output connection said distillate output connection (7) being preferably coiled along a least a part of the distillate output connection.

20. A supercritical water oxidation reactor according to claim 1, further comprising an inner liner (18) forming an inner cavity (20) being open at an upper end thereof and comprising the aqueous fluid inlet connection (10) at the lower end of the inner cavity (20), said inner liner (18) is provided with dimensions providing a horizontal distance ($\Delta_1$) between an inner surface of the reactor body (2) and an outer surface of the inner liner (18) thereby defining a space there-between and the reactor further comprising a further distillate outlet connection (17) in fluid communication with said defined space.

21. A supercritical water oxidation reactor according to claim 20, wherein said inner liner (18) is provided with dimensions providing a distance vertical ($\Delta_2$) between the bottom of the reactor body (2) and a bottom of the inner liner (18) thereby defining a space there-between, said space being in fluid communication with the further distillate outlet connection (17).

22. A supercritical water oxidation reactor according to claim 20, wherein residue output connection (4) is arranged inside the inner liner (18).

23. A supercritical water oxidation reactor according to claim 20, wherein distillate output connection (7) is arranged inside the inner liner (18).

24. A super critical water oxidation reactor according to claim 23, wherein the distillate output connection (7) comprising a coiled section encircling at least a section of the residue output connection (4).

25. A supercritical water oxidation reactor according to claim 20, wherein the inner liner (18) has a upper rim (21), which upper rim (21) is arranged at or below the same vertical height ($h_2$) as the inlet (8) of distillate output connection.

26. A supercritical water oxidation reactor according to claim 20, wherein a salt filter (16) and/or a catalyst (13) is(are) be arranged at the upper end of the inner liner (18), said catalyst being selected from the group catalysts enhancing the oxidation process(es) in the reactor.

27. A supercritical water oxidation reactor according to claim 1, wherein the reactor body comprising a reactor liner (19) forming at least a part of the reactor body (2) being in contact with the fluid inside the supercritical water oxidation reactor and is made from a material being resistant to chemical corrosion.

28. A supercritical water oxidation process for treating an aqueous fluid comprising organic and/or inorganic material the process comprising feeding the fluid into a reactor according to claim 1, and controlling the heat flux through the reactor body by use of the thermal elements (11) to obtain a vertical reference temperature profile in the reactor (1).

29. A supercritical water oxidation process according to claim 28, wherein the controlling of the heat flux through the reactor body includes:
- determining the temperatures by use of the temperature sensors (14);
- comparing the determined temperatures to the reference temperature profile, and
- at each position where a thermal element (11) is located
  - increase the heat content in fluid in the reactor at the specific location, if the temperature determined is lower than the reference temperature at the specific position, or
  - decrease the heat content in the fluid in the reactor at the specific location, if the temperature determined is higher than the reference temperature at the specific position and/or
- adjusting the flow of organics into the reactor.

* * * * *